A. B. DAVENPORT.
Meat Cutter.

No. 19,547.  Patented March 9, 1858.

UNITED STATES PATENT OFFICE.

ABNER B. DAVENPORT, OF PETERSHAM, MASSACHUSETTS.

MEAT-CUTTER.

Specification of Letters Patent No. 19,547, dated March 9, 1858.

*To all whom it may concern:*

Be it known that I, ABNER B. DAVENPORT, of Petersham, in the county of Worcester and State of Massachusetts, have invented certain new and useful Improvements in Meat-Cutting Machines; and I do hereby declare that the following is a full, clear, and exact description of the construction and operation of the same, reference being had to the accompanying drawings, in which—

Figure 1:
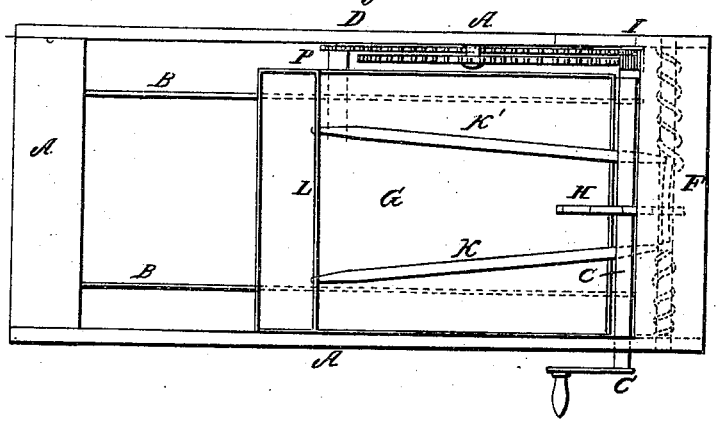
Figure 2:
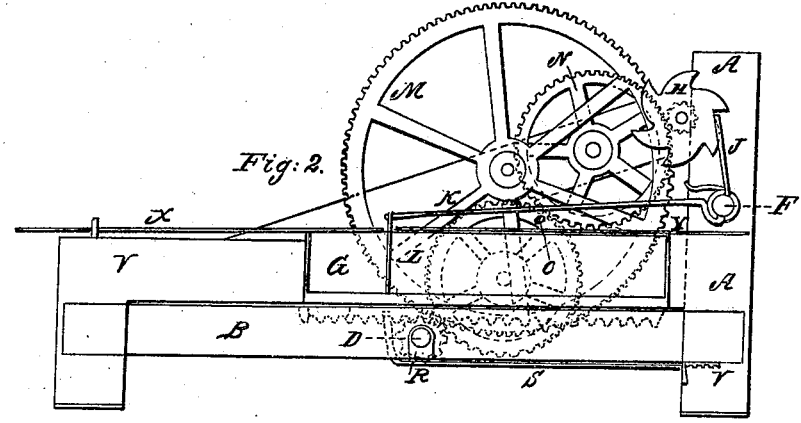
Figure 3:
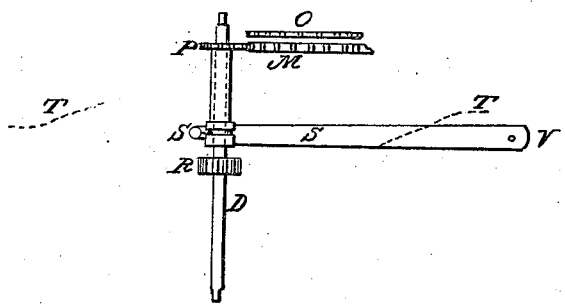

Figure 1 shows a top view. Fig. 2 shows a side elevation with one side of the frame and meat tray removed. Fig. 3 shows the shaft gearing and lever beneath the meat tray to give it its reciprocating motion, the dotted lines showing the relative position of the wedges or cams attached to the bottom of the tray to operate the lever and slide gear.

The same letters indicate the same parts in all.

In the construction of my improved machine A, A, is the frame (see drawings) supporting the ways B, B, and the shafts C, D, and F. G is a meat-tray having guides or grooves on its under surface to fit it to traverse on the ways B, B, and having a rack on its bottom to be driven by gear R on the shaft D; on the driving shaft C is placed a cam-wheel H, and pinion I. To the shaft F, is attached a lever J, to receive motion from the cam-wheel, and two arms K, K', extending over the tray G their ends supporting the knife L, they being made thin to form springs, the shaft F being fitted with spiral springs one end of each fast to the frame and the others bearing on the arms K, K', or lever J, to give the stroke.

The gear M, N, and O, are so arranged as to present M, and O, in a position to give opposite motion to the pinion P which slides on the shaft D, and turns it by a slot and key or similar device. The levers S hung to the frame at V, has the other end turned up and connects to the pinion P, by a clutch, the end of S coming up near the bottom of the tray G, on which are placed cams or wedges corresponding to the dotted lines T, T; X, and Y, are two covers under which slides the tray G.

The operation is: After placing the meat in the tray G, and replacing the cover, give motion to the shaft C; the cam H throwing back the lever J, turns the shaft F, raising the knife L by the arms K, K', and as the cam releases the lever the springs around F, throw the knife down giving a quick smart stroke, the spring of the arms K K' allowing the ends of the knife to vary, that is should there be more meat under one end than the other that end might be slightly elevated without its retarding the other, each of the curves of the cam-wheel H raising the knife, giving a succession of strokes, while the pinion I giving motion to the gear M, N, and O, and through them drives P, and R carrying the tray G, which as the end comes near the knife L by the wedge acting on the lever S, moves the gear P into the other driver, reversing the motion of the tray as each arrives near the knife L thus subjecting all the contents of the tray to its action.

I am aware that vibrating knives have been used with moving trays; these I do not claim, mine it will be seen containing a different feature its springing or yielding in connection with its vibration. Neither do I claim the use of cams to operate the knife

What I claim as new and desire to secure by Letters Patent is—

The combination in the manner and for the purposes set forth of the cam-wheel, spring-knife and reciprocating tray when constructed and operating as above set forth and described.

In testimony whereof I hereunto set my hand in the presence of two witnesses.

ABNER B. DAVENPORT.

Attest:
   H. T. CHADSEY,
   JAS. G. ARNOLD.